(12) United States Patent
Huang

(10) Patent No.: US 6,454,546 B1
(45) Date of Patent: Sep. 24, 2002

(54) MARITIME PUMP

(76) Inventor: Ching-Yuan Huang, No.2, Lane 24, Yangteh Ave. Sec.1, Taipei (TW)

( * ) Notice: Subject to any disclaimer, the term of this patent is extended or adjusted under 35 U.S.C. 154(b) by 0 days.

(21) Appl. No.: 09/747,958

(22) Filed: Dec. 27, 2000

(51) Int. Cl.$^7$ .............................................. F04B 49/00
(52) U.S. Cl. ........................ 417/331; 60/398; 290/42; 290/53
(58) Field of Search ................ 417/331; 60/392, 60/406, 398; 415/905; 290/42, 53

(56) References Cited

U.S. PATENT DOCUMENTS

| | | | | |
|---|---|---|---|---|
| 3,980,894 A | * | 9/1976 | Vary et al. | ..................... 290/42 |
| 4,086,775 A | * | 5/1978 | Peterson, Jr. | ................. 60/398 |
| 6,291,904 B1 | * | 9/2001 | Carroll | .......................... 290/42 |

FOREIGN PATENT DOCUMENTS

| DE | 3420838 A1 | * | 1/1986 | ................. 290/42 |
|---|---|---|---|---|
| JP | 2271078 A | * | 11/1990 | ................. 60/398 |

* cited by examiner

*Primary Examiner*—Cheryl J. Tyler
(74) *Attorney, Agent, or Firm*—Troxell Law Office PLLC

(57) ABSTRACT

The maritime pump of present invention has a plurality of crutches and a floating block which keeps the maritime pump at the proper position in seawater. The crutches are set at the lateral sides of the pump body, which stabilize the pump body and make the pump body slide along with it. The density of the aforementioned floating block is lower than seawater and may be put on the top or the bottom of the pump body so that it keeps the pump body at the proper position of seawater. The pump body is a tube-shaped object and is attached with a hopper, to lead seawater into the pump body. The shape and size of the piston are the same as the area of the space of the tube-like pump body. The piston has guiding holes in the relative positions of the guiding sticks, so that the guiding sticks can penetrate the guiding holes and make the piston slide along with the guiding sticks to push seawater.

7 Claims, 10 Drawing Sheets

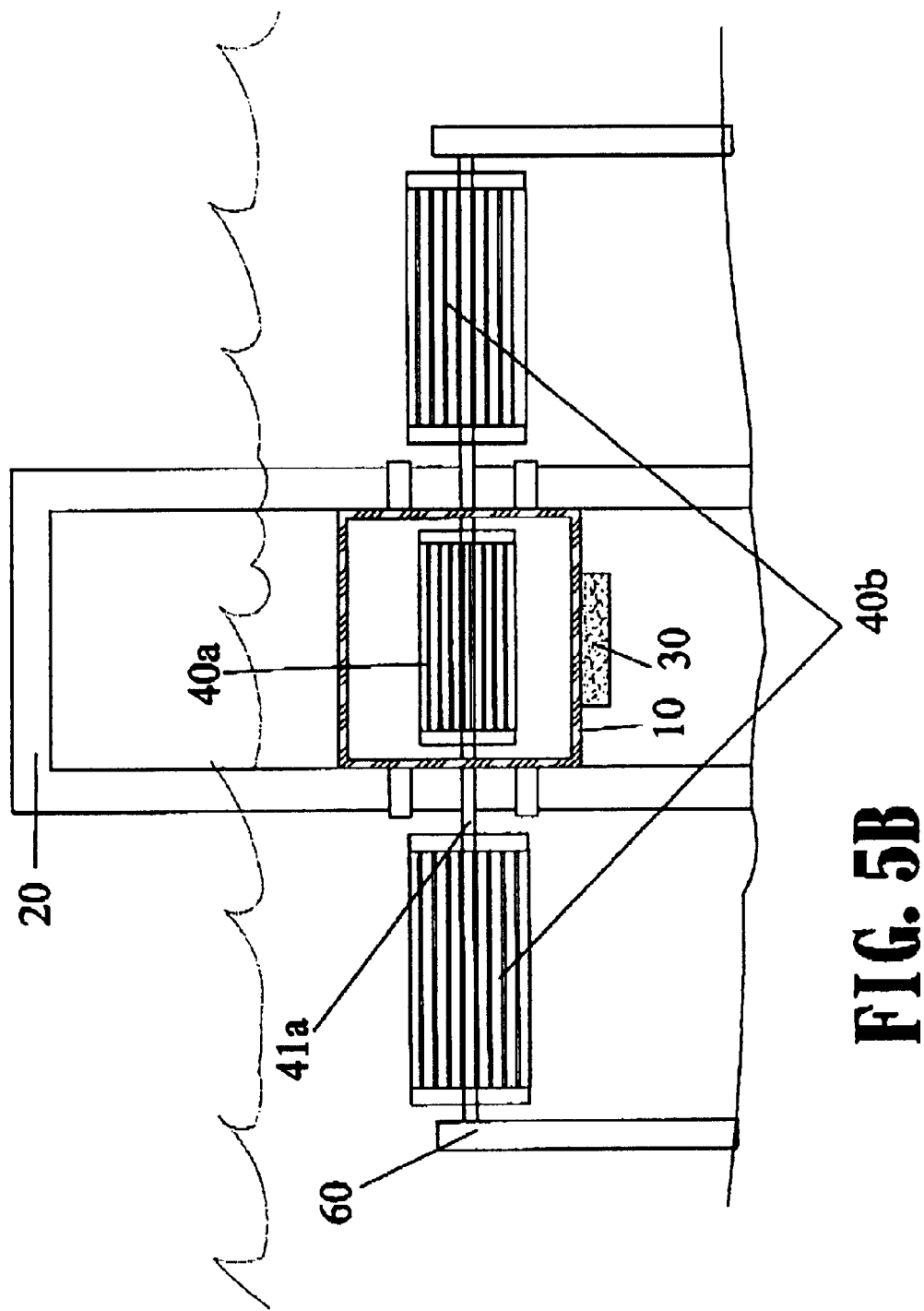

MARITIME PUMP

BACKGROUND OF THE INVENTION

1. Field of the Invention

The present invention relates to a maritime pump, and especially to a maritime pump which may lead the seawater in and out of the pump without electricity or other energies.

2. Description of the Prior Art

As everybody knows, the conventional pump comprises motors, vanes, and pistons. In such conventional pumps, electricity or other energy is used for operating the pump. However, this kind of conventional pump has the following disadvantages:

1. The pump is made of mechanical components and is operated by electricity or another energy. In this way of operating, the pump usually consumes large amounts of natural energy, and the natural energy is irretrievable.
2. The pump is always made by mechanical elements, so that it takes additional resources to keep it in good shape, and such maintenance always takes time and cost.
3. The operation of an aforementioned pump and the consuming of natural resources always produces waste and pollution.
4. Furthermore, the efficiency of such pump is usually unqualified and could not reach the anticipated purpose, so that it takes more resources to keep it operating and becomes more and more consuming of time and cost.

In order to improve the aforementioned defects, the inventor of the present invention has made a great effort and disclosed many novel designs; eventually this invention of a maritime pump is disclosed.

SUMMARY OF THE INVENTION

Accordingly, the object of the present invention is to provide a maritime pump, which is constructed only by minimum amount of mechanical devices or elements.

Because the maritime pump of present invention is constructed with mechanical devices or elements, it is easier for people to manipulate and it consumes less energy.

A further object of the present invention is that the present invention of the maritime pump causes almost no pollution.

The present invention will be better understood and its numerous objects and advantages will become apparent to those skilled in the art by referencing to the following drawings.

BRIEF DESCRIPTION OF THE DRAWINGS

FIG. 5B is the cross-section drawing of the second embodiment of present invention.

DETAILED DESCRIPTION OF THE PREFERRED EMBODIMENT

Figure 1:
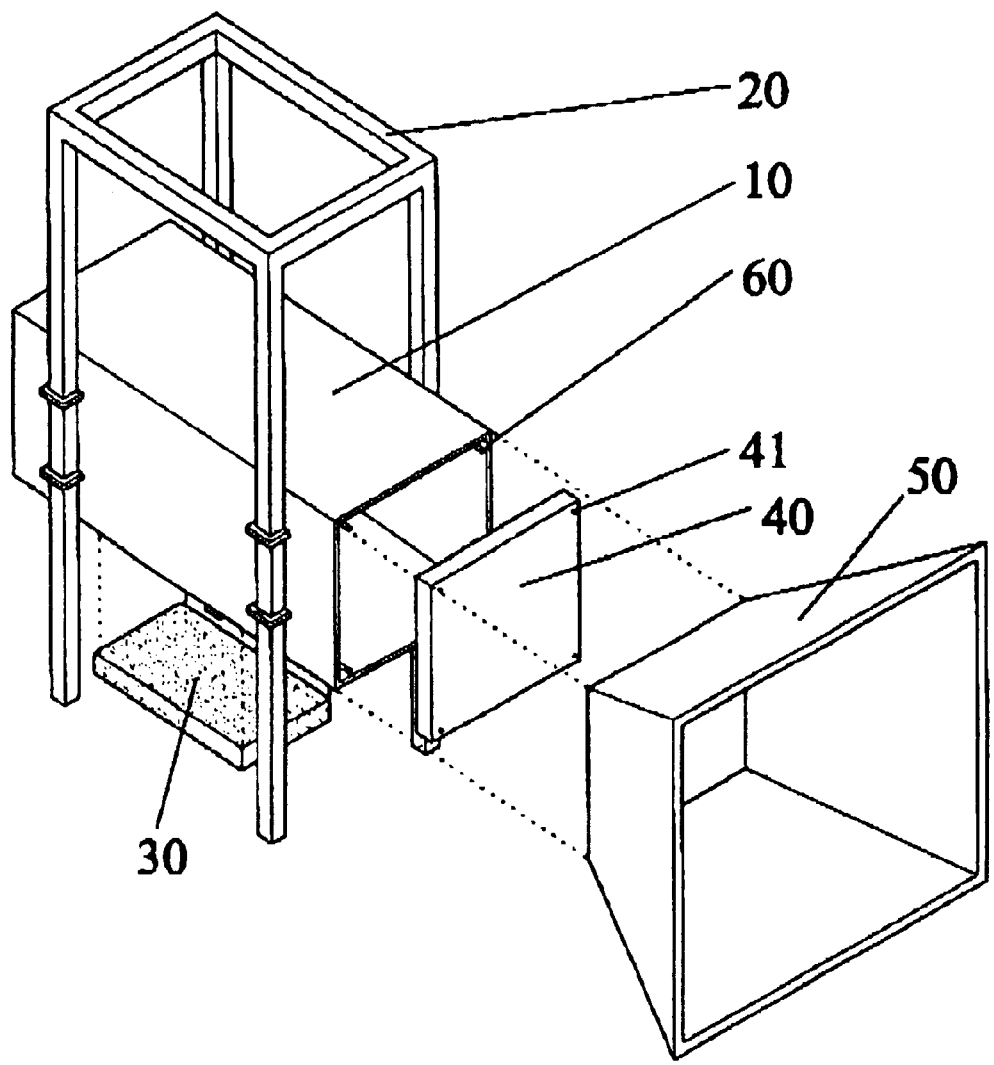
FIG. 1 is the exploded perspective view of the first embodiment of present invention.

As shown in FIG. 1, the maritime pump of present invention is composed of a plurality of supports 20 and a floating block 30 which keeps the maritime pump at the proper position in seawater. Herein, the supports 20 are set at the lateral sides of the pump body 10, which stabilize the pump body 10 and enable the pump body 10 to slide along the supports 20. The density of the aforementioned floating block 30 is lower than that of seawater and may be put on the top or the bottom of the pump body 10 so that it keeps the pump body 10 at the proper position of seawater. The aforementioned pump body 10 is a tube-shaped object and is attached with a hopper 50, to lead seawater into the pump body 10. Furthermore, a plurality of guiding sticks 60 is set in inner side of the pump body 10 so that the piston 40, which is in the pump body 10, may slide along them. The shape and size of the piston 40 are the same as the space in the tube-like pump body 10. Piston 40 is hollow so that it is easier to be pushed to move inside the pump body 10. Furthermore, there are guiding holes 41 formed on the piston 40 in the relative positions of said guiding sticks 60, so that the aforementioned guiding sticks 60 can penetrate guiding holes 41 and thus make the piston 40 slide along the guiding sticks 60 to push seawater.

Figure 2A:
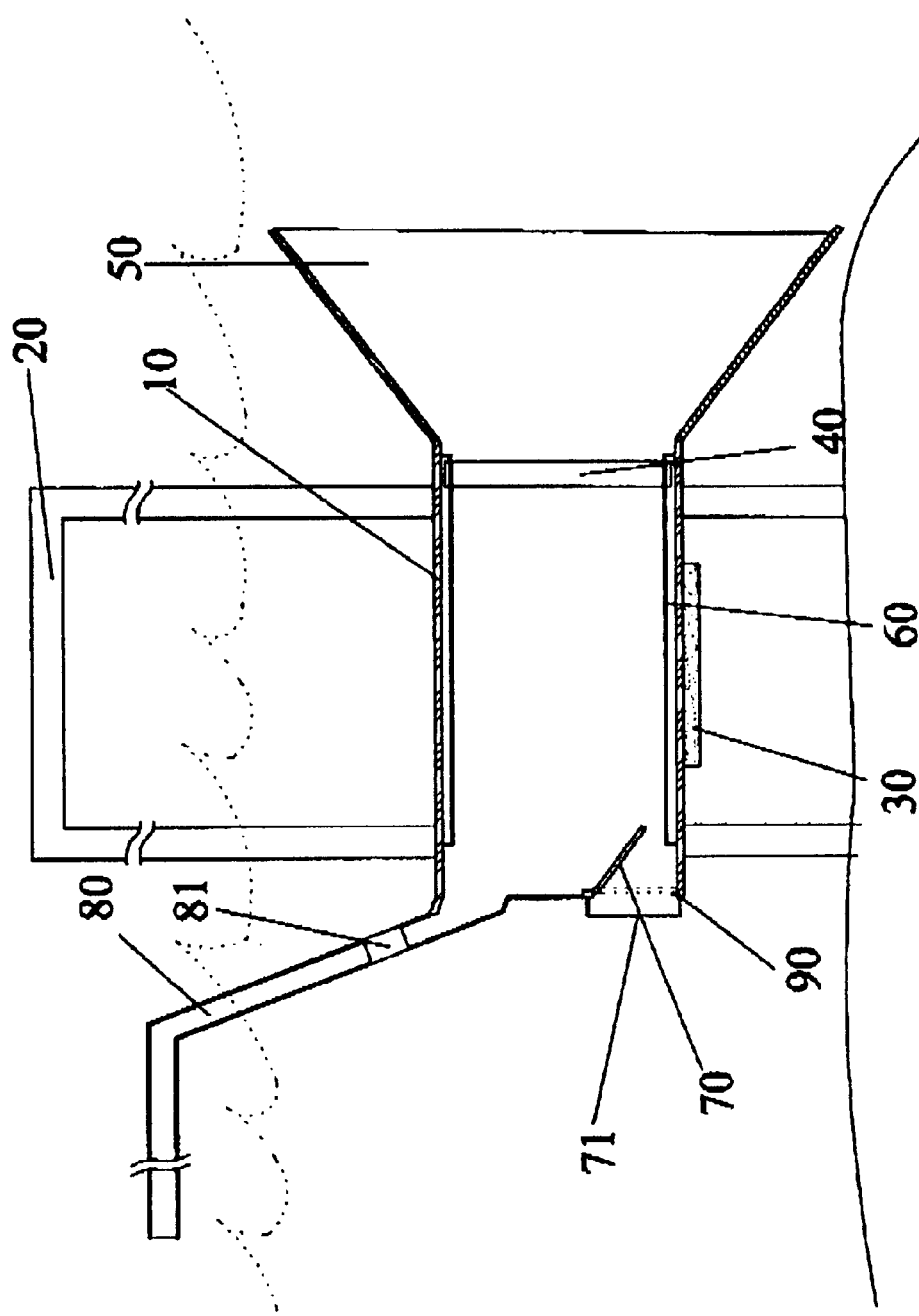
FIG. 2A is the longitudinal sectional view of the first embodiment of present invention.

FIG. 2A is the longitudinal sectional view of the first embodiment of present invention. As shown in FIG. 2A, we can see that the tube-like pump body 10 is located at the proper position in the seawater and is attached with a hopper 50 facing the seawaves, the surfaces of the hoper 50 being inclined outwardly in order to lead in more water. Besides, there are guiding holes 41 formed on the piston 40 so that the guiding sticks 60 can penetrate these guiding holes 41 and enable the piston 40 slide along with the guiding sticks 60 to push seawater. Furthermore, an anti-countercurrent valve 81 is attached in the outlet pipe 80. The outlet pipe 80 is set in the end of the pump body 10 for the outlet of seawater, the caliber of the outlet pipe 80 being much smaller than the caliber of the tube-shaped pump body 10, such that when seawater in the pump body 10 is pushed by the piston 40, it increases in pressure inside the outlet pipe 80, so that it is easy to lead out of seawater when the pressure of the outlet pipe 80 is increased. In addition, there is an intake gate 70 and a filter 71 at the rear end of the pump body 10. The filter 71 is to percolate the seawater led into the intake gate 70. A stopper 90 stops the intake gate 70, such that the seawater is prevented from leaking out of the pump body 10 when it is pushed into the outlet pipe 80. When the seawater led into the pump body 10 through the intake gate 70 is being pressed in opposite direction by the piston 40, the stopper 90 may block the intake gate 70 and keep the intake gate 70 shut, so that the seawater inside the pump body 10 will be smoothly pressed out into the outlet pipe 80 by the piston 40.

Figure 2B:
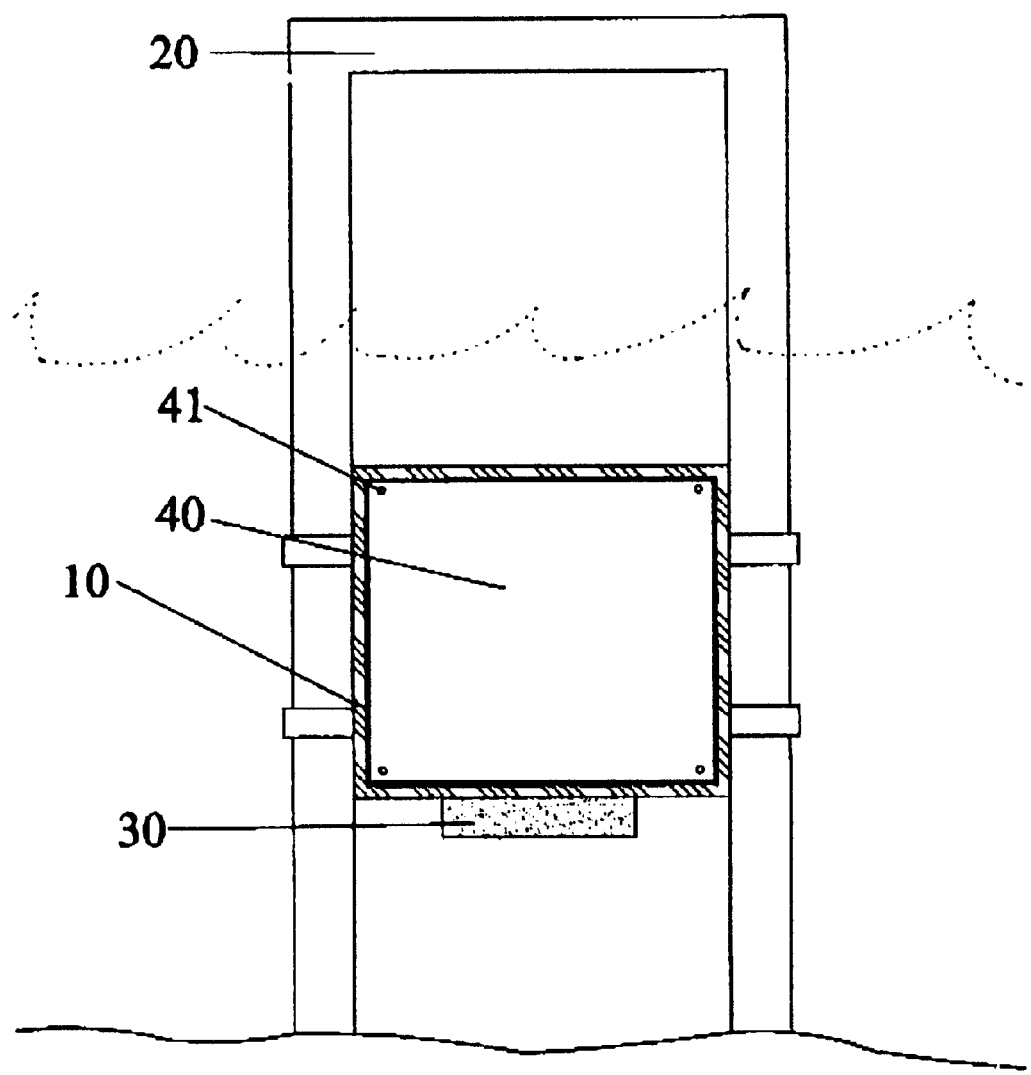
FIG. 2B is the cross-section drawing of the first embodiment of present invention.

FIG. 2B is the cross-section drawing of the first embodiment of present invention. It is clearly shown that the size and the shape of the piston 40 are the same as that of the space inside of the pump body 10. Guiding holes 41 are formed on the piston 40 in the relative positions of the guiding sticks 60. The guiding sticks 60 are made of antirust material, so that when the guiding sticks 60 penetrate the aforementioned guiding holes 41, the piston 40 can slide along the guiding sticks 60 to push the seawater inside the pump body 10 out into the outlet pipe 80.

Figure 3A:
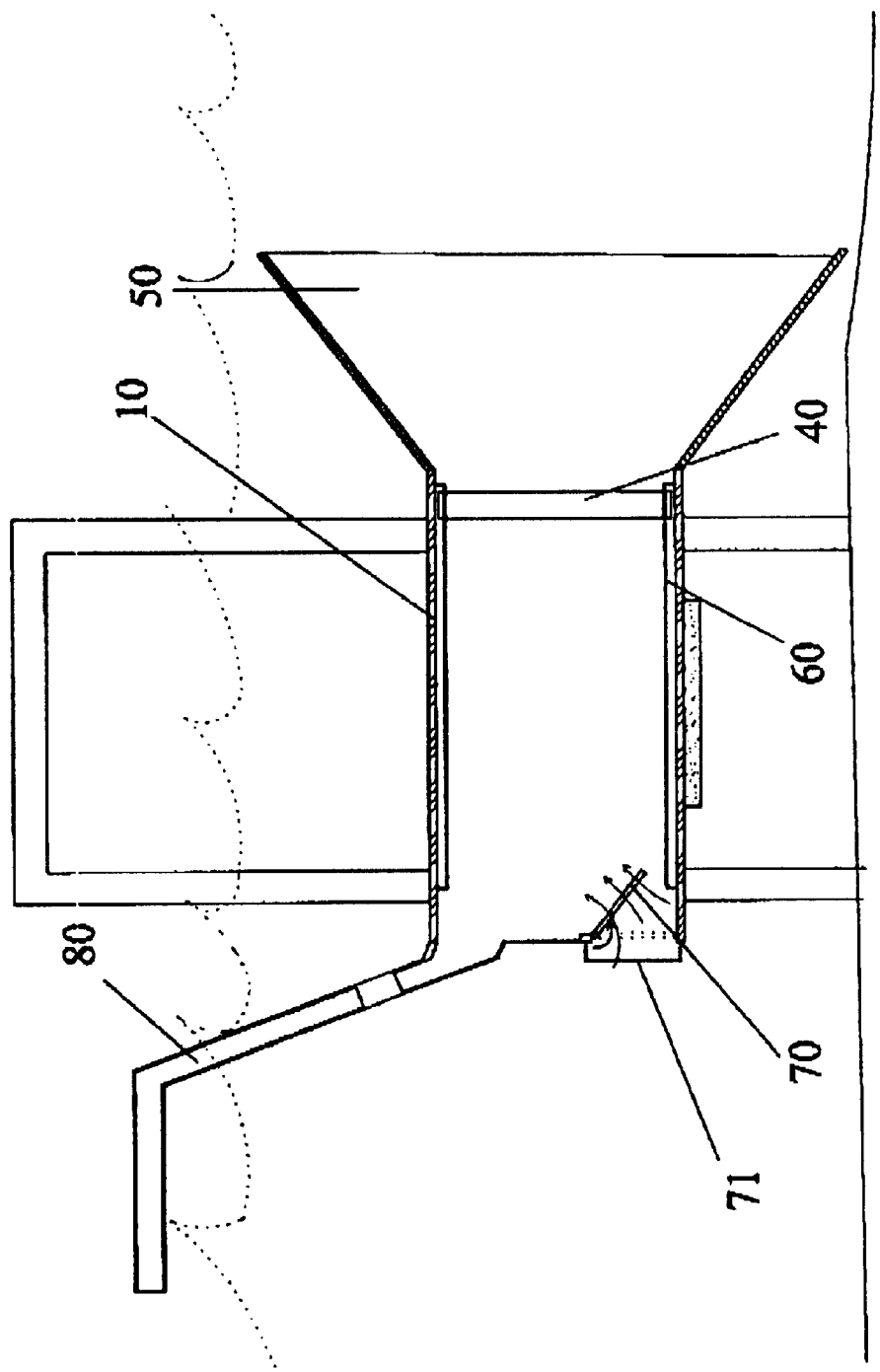
FIGS. 3A and 3B show the first embodiment of the present invention in practical use.
Figure 3B:
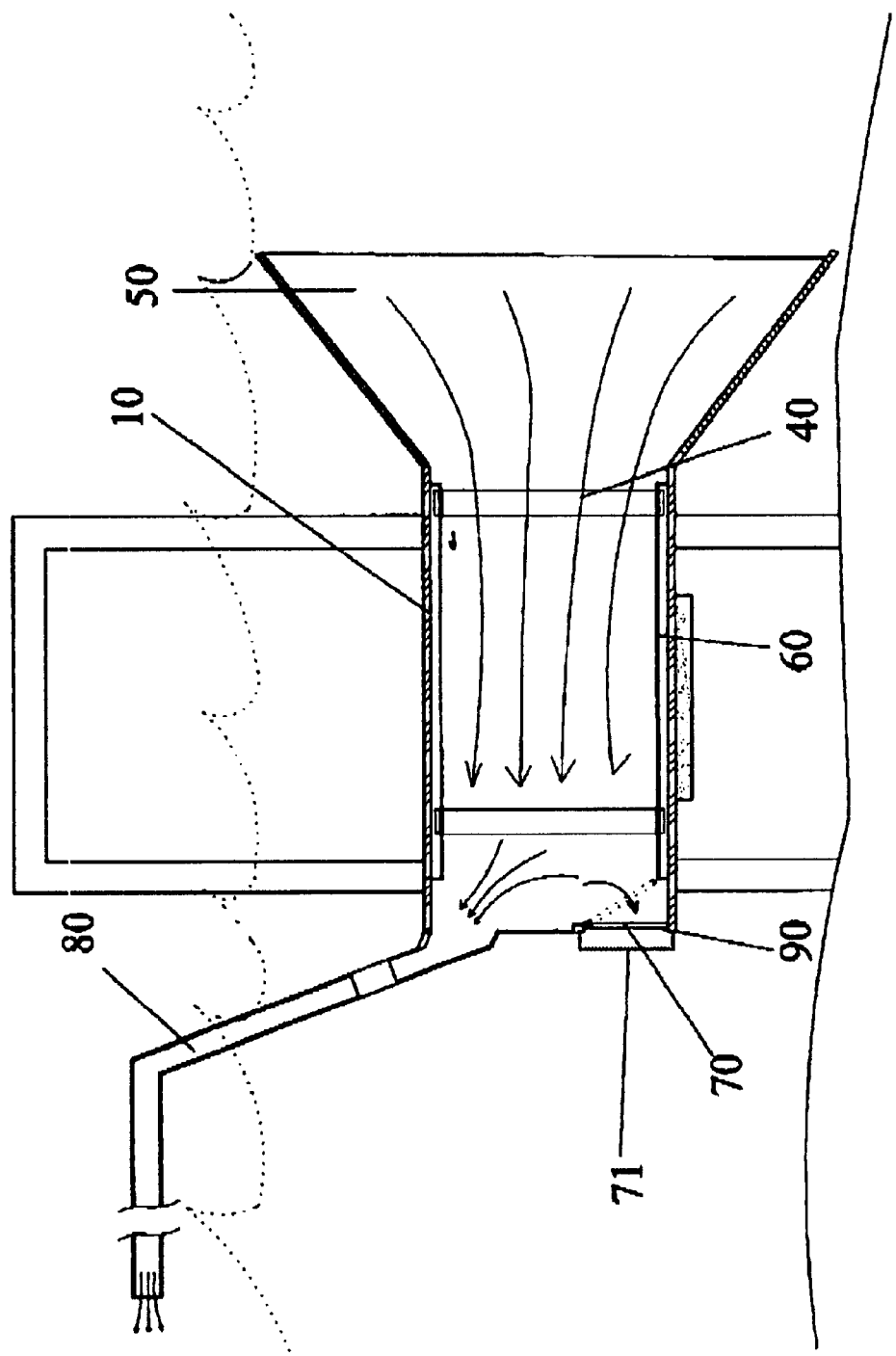

FIGS. 3A and 3B show how the first embodiment of the present invention operate. As shown in FIG. 3A, the piston 40 is not pushed by seawater so that its position is close to the front end of the pump body 10 and the hopper 50. At this moment, the intake gate 70 is opened by the seawater, so that the pump body 10 is filled with seawater. Referring now to FIG. 3B, when the seawater in the pump body 10 is pressed in the opposite direction of the leading of seawater by the piston 40, the intake gate 70 closes against stopper 90, so that the seawater inside the pump body 10 is pressed out into the outlet pipe 80 by the piston 40 in one way. In addition, because of the smaller caliber and the increasing pressure of seawater inside the outlet pipe 80, the seawater in the pump body 10 may be easily led out.

Figure 4A:
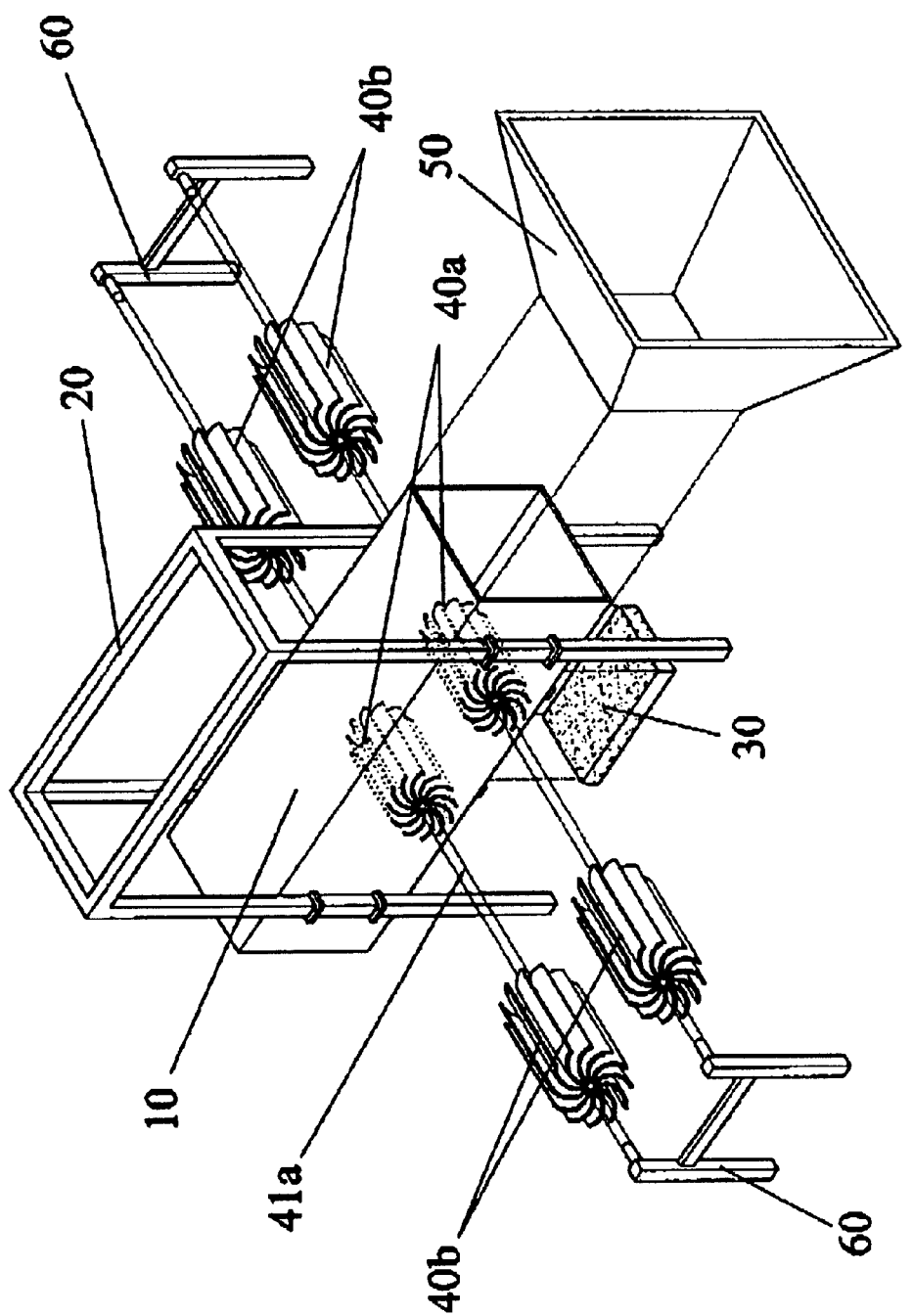
FIG. 4A is the exploded perspective view of the second embodiment of present invention.
Figure 4B:
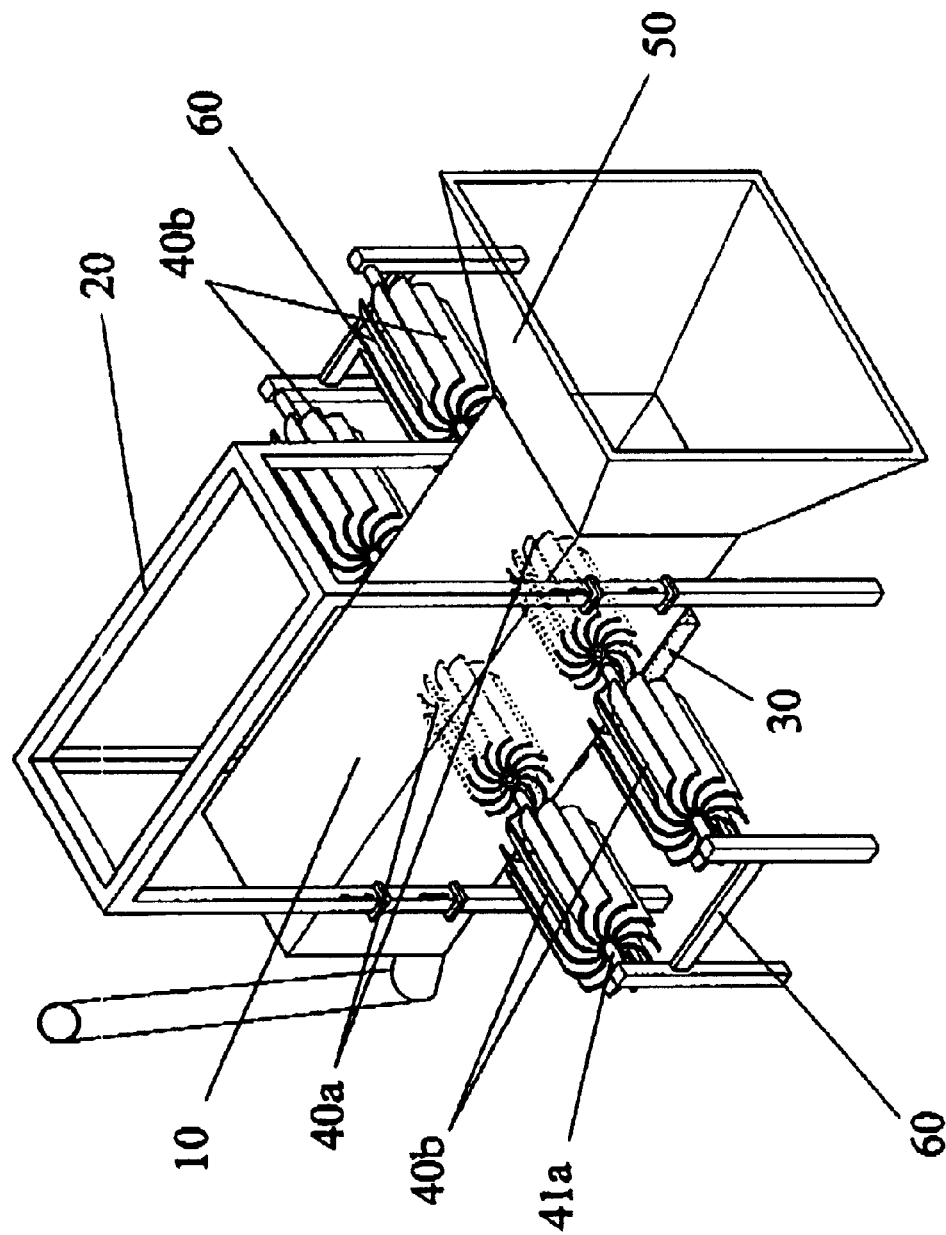
FIG. 4B is the assembled perspective view of the second embodiment of present invention.

FIGS. 4A and 4B show how the second embodiment of the present invention is composed. As shown in FIG. 4A, the relation and composition of the pump body 10 and the supports 20 are the same as in the first embodiment. One or more inner waterwheels 40a are set in the pump body 10, while a plurality of outer waterwheels 40b are set at the lateral sides of the pump body 10. Bearing 41a is a tube-shaped body being the core of the waterwheels 40a and 40b and penetrates the pump body 10 at a proper position. Said waterwheels 40a/40b are used for different purposes so that when the outer waterwheels 40b are pushed and rotated by the force of the seawave, the bearing 41a may also rotate the coaxial inner waterwheels 40a. Accordingly, the seawater in the pump body 10 may be pushed into the outlet pipe 80 and easily led out.

Figure 5A:
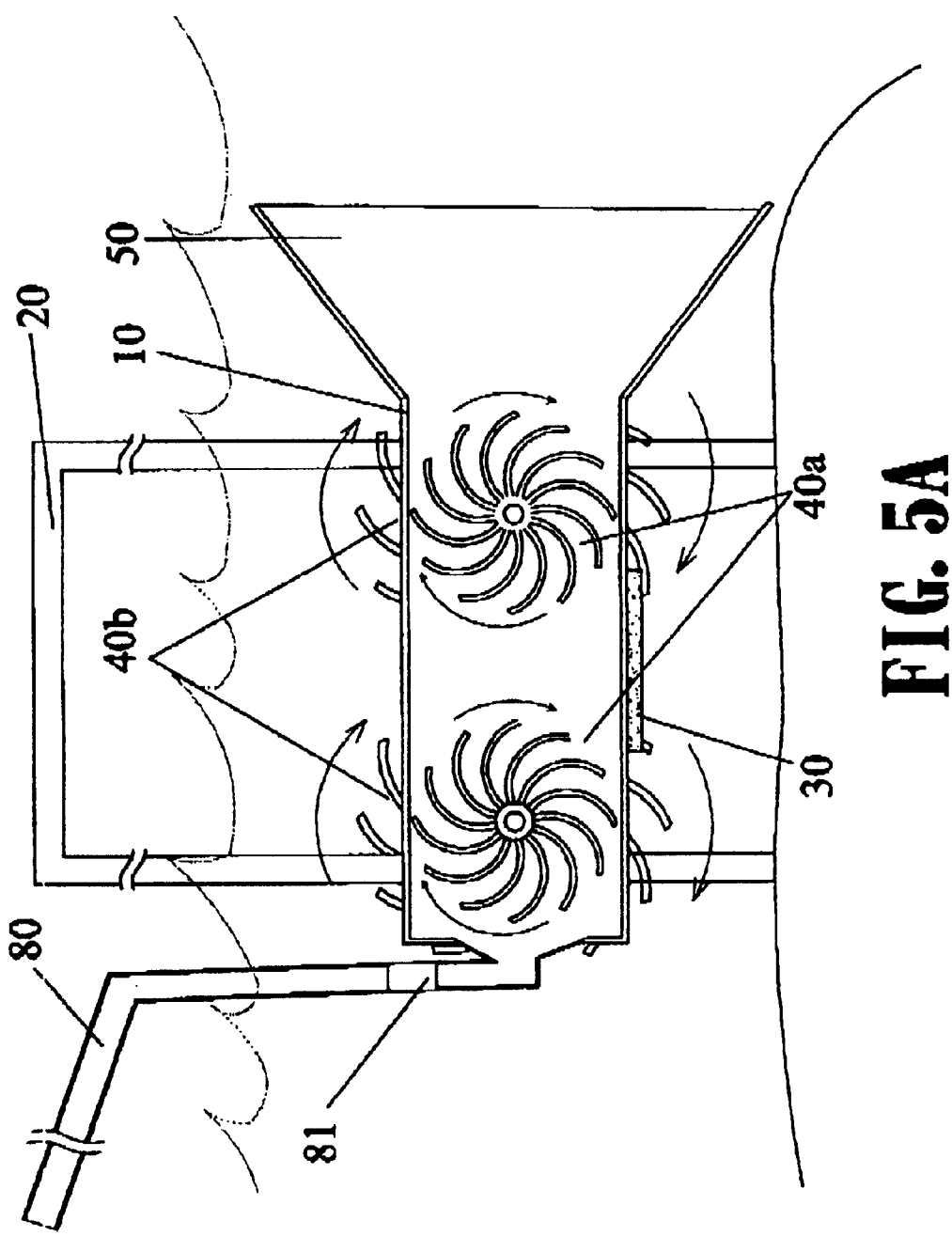
FIG. 5A is the longitudinal sectional view of the second embodiment of present invention.
Figure 6:
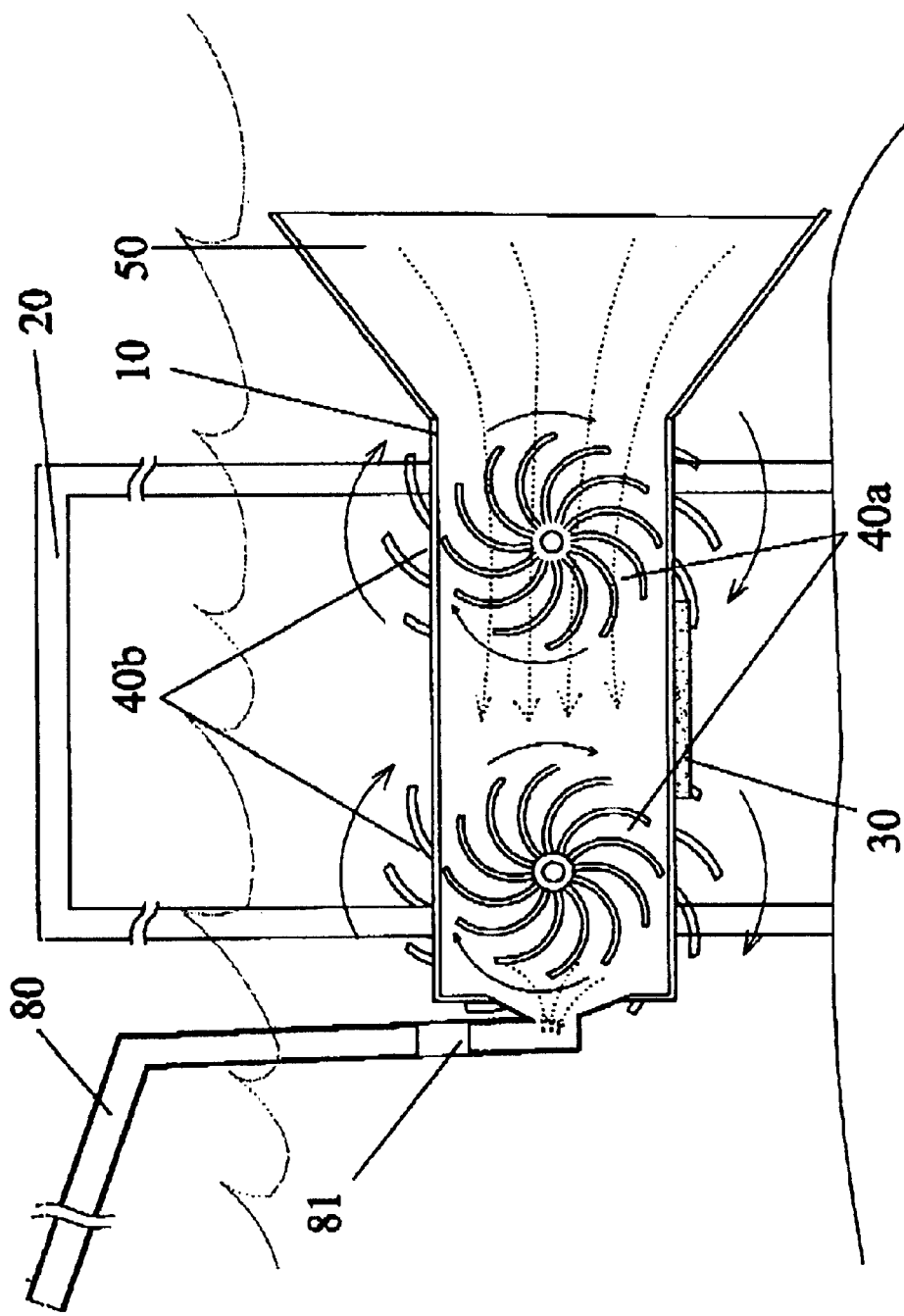
FIG. 6 shows the second embodiment of the present invention in practical use.

FIG. 5A is a longitudinal view and cross-section drawing of the second embodiment of present invention. As shown in FIG. 5A, the inner waterwheels 40a are set at a proper position in the pump body 10, while the plurality of outer waterwheels 40b are set in pairs at lateral sides of the pump body 10. When the seawave strikes, the outer waterwheels are pushed and rotated by said seawave. Further, the inner waterwheels 40a are rotated by the bearing 41a and thus guide the seawater into the outlet pipe 80.

Accordingly, from the aforementioned description, the maritime pump of present invention certainly has the effect of absorbing seawater for people's utilization without using the artificial energy. It is then an invention worthy for many kind of applications.

Although the present invention has been described using the specified embodiment, the examples are meant to be illustrative and not restrictive. It is clear that many other various would be possible without departing from the basic approach, demonstrated in the present invention.

What is claimed is:

1. A submerged maritime pump comprising:
   a) a plurality of supports;
   b) a hollow tube pump body having opposite lateral sides slidably mounted on the plurality of supports, the hollow tube pump body having front and rear ends;
   c) a floating block mounted on the hollow tube pump body so as to position the hollow tube pump body at a predetermined level below a water surface;
   d) a hopper mounted on the front end of the hollow tube pump body including a plurality of surfaces inclined outwardly from the pump body so as to direct water into the tube pump body;
   e) an outlet pipe mounted to the rear end of the tube pump body and having therein an anti-countercurrent valve, a cross-section of the outlet pipe being smaller than a cross-section of the hollow tube body;
   f) an intake on the rear end of the tube pump body, the intake including an intake gate pivotally connected to the tube pump body so as to pivot inwardly into the tube pump body to open the intake and a stopper to locate the intake gate in a closed position;
   g) a plurality of guiding sticks located within the tube pump body; and,
   h) a piston slidably movable on the guiding sticks and located within the tube pump body so as to be movable between the front and rear ends of the tube pump body, the piston having a cross-sectional configuration the same as the tube pump body, whereby movement of the piston from the front end of the tube pump body towards the rear end urges water in the tube pump body through the outlet pipe.

2. The submerged maritime pump of claim 1 wherein the floating block is mounted to a bottom of the tube pump body.

3. The submerged maritime pump of claim 1 wherein the piston is hollow.

4. The submerged maritime pump of claim 1 wherein a density of the floating block is less than density of seawater.

5. A submerged maritime pump comprising:
   a) a plurality of supports;
   b) a hollow tube pump body having opposite lateral sides slidably mounted on the plurality of supports, the hollow tube pump body having front and rear ends;
   c) a floating block mounted on the hollow tube pump body so as to position the hollow tube pump body at a predetermined level below a water surface;
   d) a hopper mounted on the front end of the hollow tube pump body including a plurality of surfaces inclined outwardly from the pump body so as to direct water into the tube pump body;
   e) an outlet pipe mounted to the rear end of the tube pump body and having therein an anti-countercurrent valve, a cross-section of the outlet pipe being smaller than a cross-section of the hollow tube body;
   f) a plurality inner waterwheels located within the tube pump body, each inner waterwheel mounted on a bearing rod having opposite end portions extending exteriorly of the tube pump body at opposite sides of the tube pump body; and,
   g) an outer waterwheel mounted on each end portion of each bearing rod so as to rotate therewith.

6. The submerged maritime pump of claim 5 wherein the floating block is mounted to a bottom of the tube pump body.

7. The submerged maritime pump of claim 5 wherein a density of the floating block is less than density of seawater.

* * * * *